Oct. 4, 1927.
A. C. PITMAN
1,644,489
STUFFING BOX
Filed Dec. 27, 1923
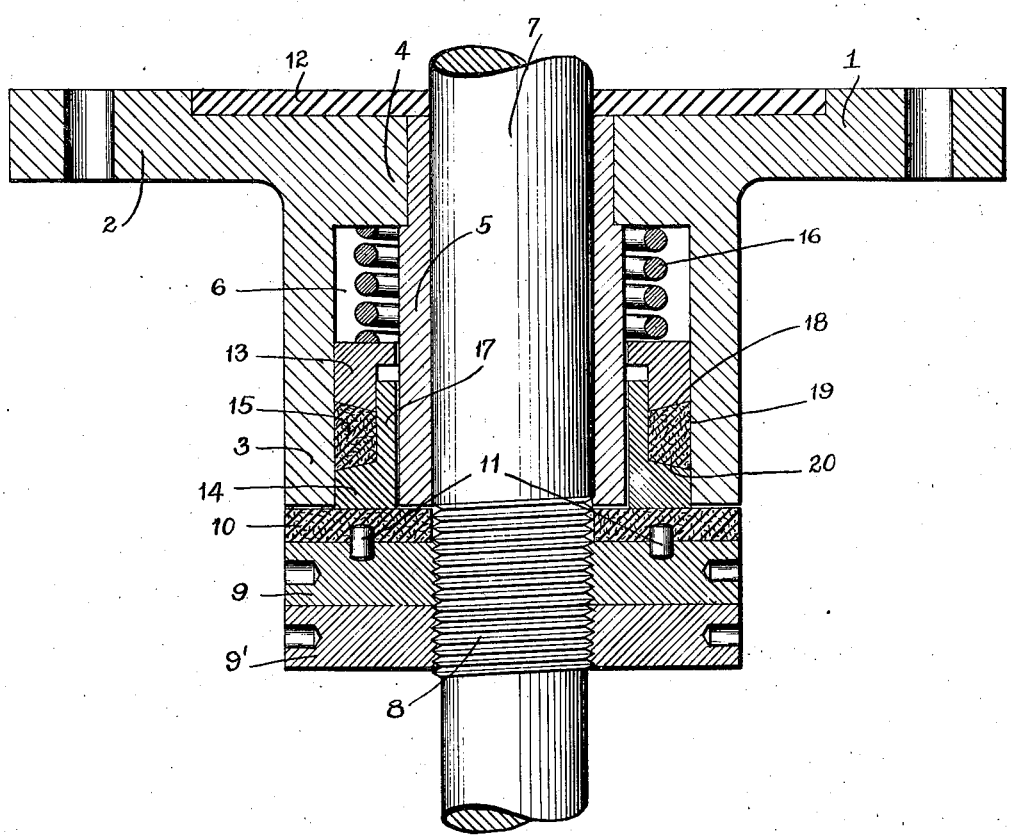
Inventor
Andrew C. Pitman,
By his Attorneys,
Ward, Crosby and Smith Patented Oct. 4, 1927.

1,644,489

UNITED STATES PATENT OFFICE.

ANDREW C. PITMAN, OF TORRINGTON, CONNECTICUT, ASSIGNOR OF ONE-FOURTH TO WILLIAM R. BASSICK, OF TORRINGTON, CONNECTICUT.

STUFFING BOX.

Application filed December 27, 1923. Serial No. 682,872.

The invention relates to improvements in stuffing boxes. An object of the invention is the provision of an improved stuffing box construction which shall be particularly efficient in operation, comparatively inexpensive and which shall be readily assembled and taken apart. Another object of the invention is the provision of a stuffing box construction in which the packing within the stuffing box bears against stationary parts of the construction and not against the rotating shaft whereby wear both upon the shaft and upon the packing is largely obviated.

In the preferred form of construction a space is provided between a bearing sleeve, in which the shaft is mounted, and an outer wall of the stuffing box chamber. Within this space are mounted a pair of rings with interposed packing, the outermost ring bearing against a washer fastened on the shaft at the outer end of the stuffing box. The rings and packing are spring pressed axially of the shaft so that the outer ring will seat against the rotating washer on the shaft. At the same time the packing interposed between the two rings is not only pressed firmly against the contacting surfaces of the rings, but is also pressed firmly against an adjacent stationary surface of the stuffing box, so that the outward passage of fluid through the stuffing box is prevented at all points.

Other objects of the invention comprise the provision of improved combinations of parts and details of construction, all as will be more fully described in the following specification, and be particularly pointed out in the appended claims.

In order that the invention may be more clearly understood attention is hereby directed to the accompanying drawing forming part of this application, and illustrating one form of the invention. In the drawing the figure represents a central longitudinal section through the stuffing box, the rotatable shaft mounted therein being shown in plan view.

Referring to the drawing, the construction as shown comprises a stuffing box chamber, or chambered member 1, which may comprise a face plate portion 2 and an axially extending annular flange 3. The face plate portion of the stuffing box member is provided with an annular shoulder portion 4 extending inwardly from the flange 3 and provided with a cylindrical opening in which is mounted the bearing sleeve 5. The bearing sleeve is firmly secured to the stuffing box chamber in any suitable way, as by being pressed into engagement therewith. Bearing sleeve 5 extends longitudinally for the same distance as the flange 3, an annular space 6 thereby being provided between flange 3 and sleeve 5.

The rotatable shaft 7 extends through and is rotatably mounted in bearing sleeve 5. This shaft, as shown, is provided with a screw-threaded portion 8 beyond the stuffing box on which the nut 9 and the lock nut $9^1$ may be threaded, when the construction is assembled, a washer 10 being secured to the rear face of nut 9 in any suitable manner, as by means of pins 11, (considering the end of the box at which face plate 2 is located as the rear end). At the rear end of the stuffing box a disc 12 is shown as mounted on the shaft, and seated in a suitable recess in the face, 2, of the stuffing box member.

A seal is provided within the annular chamber 6 of the stuffing box by means of a pair of metal rings 13 and 14 with an interposed packing ring 15. A spiral spring 16 is mounted within the annular chamber 6, one end of the spring abutting against the shoulder portion 4 of the stuffing box member, the other end of the spring bearing against the rear end of ring 13. When nut 9 and its washer 10 have been screwed up into position the spring will accordingly press ring 13 against packing 15, the latter against ring 14 and the latter firmly against washer 10.

Rings 13 and 14 preferably fit loosely within chamber 6 so that they may readily be slipped into and removed from the same in assembling and disassembling the construction. Preferably the packing ring 15 is of a partial V-shape in cross section, as shown, the inner side of the ring, that is the side nearest to the shaft, being of a less height than the outer side, that is, the side adjacent to the outer flange 3 of the stuffing box, the forward and rear, or top and bottom, faces of packing ring 15 being inclined, or one of the same being inclined, while the adjacent surfaces of rings 13 and 14 are correspondingly inclined to bear against the inclined surfaces of the packing 15. Ring 14 is also preferably provided with a longitudinal inner flange 17 which extends axially past the base of inner side of packing 15 and alongside the inner surface of ring 13.

With this construction the pressure exerted by spring 16 applied through ring 13 results in forcing or camming packing 15 radially outwards against the adjacent inner surface of flange 3 of the stuffing box member, so that a tight seal will be effected at the planes of contact 18, between ring 13 and packing 15; 19, between packing 15 and flange 3; and 20 between packing 15 and ring 14. It is obvious that the greater the pressure exerted by spring 16, the more firmly will packing 15 be pressed radially outwards against the inner surface of flange 3.

With this construction any fluid which leaks along the surface of shaft 7 through the stuffing box, may pass outwards along the rear surface of washer 10, adjacent to the end of bearing sleeve 5, until the inner edge of ring 14 is encountered. The fluid cannot pass radially beyond this point because of the firm engagement of stationary ring 14 with the adjacent surface of rotatable washer 10. Leakage fluid which backs up into chamber 6, between the inner face of ring 14 and the outer surface of sleeve 5, and rearwardly past ring 13, may pass between the inner surface of flange 3 and the outer surface of ring 13 until the edge of the outer face of packing 15 is encountered. Further passage of the fluid will be barred at this point because of the firm engagement of the outer face of packing 15 and the inner surface of flange 3. Some of the fluid also may pass between the outer surface of flange 17 of ring 14 and the inner surface of ring 13, until the inner surface of packing 15 is encountered. This fluid, however, cannot pass either along the line 18, between ring 13 and packing 15, or along line 20 between packing 15 and ring 14, so that leakage by all of these paths is prevented.

The packing 15 and the washer 10 may be formed of any suitable composition, or material, and the construction may be used for any form of stuffing box in which leakage past a rotating element is to be prevented. For example, when the leakage of both water and oil is to be prevented, packing 15 and washer 10 may be formed of a suitable material, such as a suitable fibre composition. When the passage of water, under gravity feed only, is to be prevented, the washer and packing may suitably be formed of felt or similar material, and spring 16 may be comparatively light. When the passage of fluid under heavier pressure is to be prevented, a stronger spring will, of course, be used, and washer 10 and packing 15 will be formed of a more durable material adapted to withstand the heavier pressure of spring 16 such material being, for example, leather, rubber, or the like.

It will be noted that packing 15 bears only against stationary parts so that wear of the same is largely prevented, and the wear upon the shaft which is caused in some prior constructions by the engagement of packing with the rotating shaft is prevented. A rotating engagement takes place between the adjacent surfaces of ring 14 and washer 10 but ring 14 is constantly held in close contact with the surface of washer 10 because of the pressure of spring 16 and washer 10 may, of course, readily be replaced when it has worn unduly.

It will also be noted that the bearing sleeve 5 forms in effect an inner annular longitudinal wall for the stuffing box, and where, in the claims, reference is made to a stuffing box having inner and outer longitudinal walls, the "inner" wall should not be understood as limited to cover only a part integral with the outer wall.

It should be noted that the invention is not limited strictly to the details of construction which have been particularly described, but that the same is as broad as is indicated by the accompanying claims.

What I claim is:

1. In a stuffing box, the combination of a stuffing box having inner and outer longitudinal walls separated by an annular chamber open at one end, the inner wall surrounding an opening through the box, a rotatable shaft extending through said opening, an annular member adjustably secured on said shaft to rotate therewith adjacent to the open end of said chamber, sealing means in said chamber, and means for resiliently pressing said sealing means and annular member together and pressing said sealing means against one of said longitudinal walls.

2. In a stuffing box, the combination of a stationary stuffing box member having an outer wall, bearing means separated from said outer wall by an annular space open at one end, a rotatable shaft extending through said bearing means, rings and interposed packing in said space adjacent the open end of said space, a helical spring within said space and surrounding said shaft and bearing means for pressing said packing against the inner surface of said outer wall, and an annular packing member adjustably secured to said shaft and against which the ring farthest from said spring is pressed thereby.

3. In a stuffing box, the combination of a stationary stuffing box member having an outer wall and bearing means separated from said outer wall by an annular space open at one end, a rotatable shaft extending through said bearing means, rings and interposed packing in said space adjacent the open end of said space, spring means for pressing said packing against the inner surface of said outer wall, and a disc shaped packing member carried by a member adjustably screw threaded on said shaft and against which the ring farthest from said spring means is pressed thereby.

In testimony whereof I have signed my name to this specification.

ANDREW C. PITMAN.